(12) United States Patent
Murali et al.

(10) Patent No.: US 10,904,284 B2
(45) Date of Patent: Jan. 26, 2021

(54) ENABLING SOFTWARE DISTRIBUTION

(71) Applicant: International Business Machines Corporation, Armonk, NY (US)

(72) Inventors: Srikanth K. Murali, Bangalore (IN); Vijay Kumar Ananthapur Bache, Bangalore (IN); Padmanabha Venkatagiri Seshadri, Mysore (IN); Vijay Ekambaram, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 16/131,206

(22) Filed: Sep. 14, 2018

(65) Prior Publication Data

US 2020/0092303 A1    Mar. 19, 2020

(51) Int. Cl.
*H04L 29/06* (2006.01)
*G06F 8/60* (2018.01)

(52) U.S. Cl.
CPC .............. *H04L 63/145* (2013.01); *G06F 8/60* (2013.01); *H04L 63/1416* (2013.01)

(58) Field of Classification Search
CPC ................ H04L 67/1097; H04L 63/0428
See application file for complete search history.

(56) References Cited

U.S. PATENT DOCUMENTS

| | | | |
|---|---|---|---|
| 6,138,153 A * | 10/2000 | Collins, III | G06F 8/61 709/202 |
| 6,643,775 B1 | 11/2003 | Granger | |
| 7,051,200 B1 | 5/2006 | Manferdelli | |
| 7,539,875 B1 | 5/2009 | Manferdelli | |
| 9,355,060 B1 * | 5/2016 | Barber | H04L 67/2852 |
| 2001/0037450 A1 * | 11/2001 | Metlitski | G06F 21/123 713/152 |
| 2003/0084322 A1 | 5/2003 | Schertz | |
| 2004/0025084 A1 * | 2/2004 | Krueger | G06F 9/4812 714/35 |
| 2006/0090084 A1 * | 4/2006 | Buer | G06F 21/575 713/189 |
| 2007/0074187 A1 * | 3/2007 | O'Brien | G06F 8/656 717/140 |
| 2009/0007100 A1 | 1/2009 | Field | |
| 2010/0037056 A1 * | 2/2010 | Follis | H04L 9/3271 713/171 |
| 2012/0079281 A1 | 3/2012 | Lowenstein | |

(Continued)

FOREIGN PATENT DOCUMENTS

| | | |
|---|---|---|
| CN | 105117303 A | 12/2015 |
| CN | 106302314 A | 1/2017 |

OTHER PUBLICATIONS

"Enabling Software Distribution", PCT Application No. PCTIB2019/057430, filed on Sep. 4, 2019, 47 pages.

(Continued)

*Primary Examiner* — Jason K Gee
(74) *Attorney, Agent, or Firm* — David K. Mattheis; William H. Hartwell; Nicholas L. Cadmus

(57) ABSTRACT

Distributing and executing software upon devices by providing a computer program; dividing the computer program into a set of shreds; improving the communications fault tolerance of the shreds; encrypting the shreds; and distributing individual shreds to a shadow processor of a device for assembly and execution.

6 Claims, 7 Drawing Sheets

(56) References Cited

U.S. PATENT DOCUMENTS

| | | |
|---|---|---|
| 2015/0052354 A1 | 2/2015 | Purohit |
| 2015/0304337 A1 | 10/2015 | Nguyen-Tuong |
| 2016/0299765 A1 | 10/2016 | Wesie |
| 2016/0328559 A1 | 11/2016 | Davidson |
| 2016/0342777 A1 | 11/2016 | Sadhasivan |
| 2018/0048622 A1 | 2/2018 | Gaitatzis |

OTHER PUBLICATIONS

Patent Cooperation Treaty, Notification of Transmittal of the International Search Report and the Written Opinion of the International Searching Authority, or the Declaration, dated Nov. 27, 2019, 9 pages.

Gautam et al., "A Novel Software Protection Approach for Code Obfuscation to Enhance Software Security", International Journal of Mobile Computing and Multimedia Communications, vol. 8, Issue 1, Jan.-Mar. 2017, pp. 34-47, DOI: 10.4018/IJMCMC.2017010103, IGI Publishing Hershey, PA, USA.

Mell et al., "The NIST Definition of Cloud Computing", Recommendations of the National Institute of Standards and Technology, Special Publication 800-145, Sep. 2011, 7 pages.

Schrittwieser et al., "Covert Computation Hiding Code in Code for Obfuscation Purposes", Asia CCS'13, May 8-10, 2013, Hangzhou, China, Copyright 2013, pp. 529-534.

Schrittwieser et al., "Protecting software through obfuscation: Can it keep pace with progress in code analysis?", ACM Computing Surveys, vol. 49, No. 1, Article 4, Publication date: Apr. 2016, 37 pages.

Wei et al., "A Firewall of Two Clouds: Preserving Outsourced Firewall Policy Confidentiality with Heterogeneity", 2016 IEEE Global Communications Conference (GLOBECOM), Year: 2016, pp. 1-6.

\* cited by examiner

ENABLING SOFTWARE DISTRIBUTION

BACKGROUND

The invention relates generally to the field of distributing and executing software and more particularly to the field of covert software distribution and execution.

Malicious software (malware), may infect devices at the file, anti-virus (AV), or operating system (OS), level. The in-system AV may be able to effectively address infections at the file and some OS levels but ineffective for infections in the core OS, or in the AV itself.

Diagnostic software implemented upon a device may be used to determine the presence and nature of malware operating on the device. Such software may operate to detect and subsequently remove or otherwise quarantine malicious code on the device.

Malware may include the capacity to identify and circumvent anti-malware diagnostic efforts by monitoring device performance measures and selectively blocking network communications channels associated with downloading diagnostic programming, or by adapting the attack pattern of the malware in association with the activities of the anti-malware or diagnostic programming.

SUMMARY

An aspect of the present invention includes methods, computer readable instructions and systems for distributing and executing software upon devices including: providing a computer program; dividing the computer program into a set of shreds; improving the communications fault tolerance of the shreds; encrypting the shreds; and distributing individual shreds to a device.

DETAILED DESCRIPTION

Figure 1:
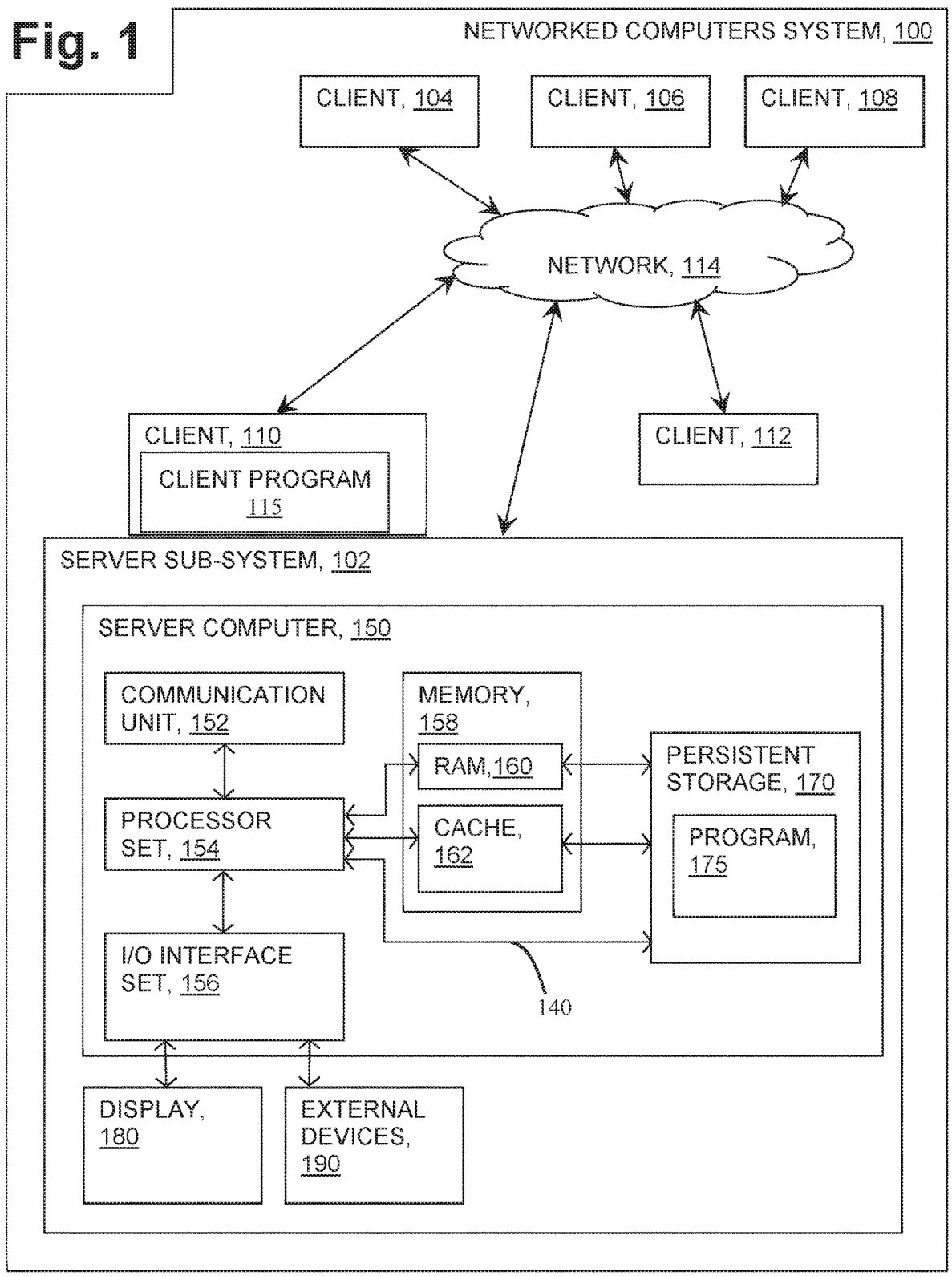
FIG. 1 provides a schematic view of the system of an embodiment of the invention.

A device compromised by malware at the operating system level or in the device anti-virus software itself, may be immune to standard methods for malware detection. The current malware may monitor the activities of the device CPU and storage activity to determine when and how diagnostic efforts are executing. The malware may also monitor the content of any diagnostic program, enabling the malware to adapt to evade control by the diagnostic software. The malware may control the network access of the device, preventing any effort to download diagnostic software, or to remotely diagnose the device condition over the network connection. In an embodiment, the systems and methods enable diagnostic software to be passed to a target device in a network while also enabling the covert execution of the software beyond the view of current malware. In this embodiment, the payload diagnostic software, or Malware Diagnostic Program (MDP) is divided into shreds which are then passed to the target using unconventional pathways. The shreds are detected by a device shadow processor (SP), reassembled and executed by the SP out of view of any resident malware.

In an embodiment, a system comprises a server and a plurality of networked devices in communication with the server, and in peer-to-peer communications with each other. The devices broadcast their identity enabling other devices in the network to determine which peer devices are nearby. In an embodiment, the device also broadcasts the identities of nearby devices, enabling network device interactions to be monitored and analyzed. In this embodiment, the peer devices include smart phones, IoT devices, networked computers, servers, and other network devices. The devices comprise application code which may be executed by the device's main processor. The devices may have a display and a user interface as well as a set of sensors. Each device comprises a SP (shadow processor) in addition to the main device processor. The SP may be a separate microprocessor or may be a virtual machine operating as a partitioned portion of a single CPU of the device. The SP is configured as a monitor of the main processor and other device components such as device storage elements. The device is configured to enable the SP to monitor the main processor and device main storage but prevents the main processor from seeing the activities of the SP. System architecture such as the Intel Management Engine, the AMD Platform Security Processor, or analogous systems may be used for the methods of the invention. (Note: the term(s) "INTEL" and/or "AMD" may be subject to trademark rights in various jurisdictions throughout the world and are used here only in reference to the products or services properly denominated by the marks to the extent that such trademark rights may exist.)

In this embodiment, the SP is configured to enable cryptographic functions such as dual key encryption and decryption as well as erasure coding and reversing erasure coding of data. The SP is pre-configured with instructions and code keys associated with recognizing code shreds as well as deciphering and decrypting received shreds.

Each networked device may be defined in terms of its network relationship to all other devices including: the contact frequency and duration between a particular device and each other device in the network (the Device to Device (D2D) contact pattern), the potential each networked device has to influence the environment a particular target device occupies over time (Incubator profile), as well as the software application set resident upon each device including metadata regarding the frequency of use of the respective applications (the Device Application Profile). The system administrator monitors peer-to-peer activity and software updates to maintain the D2D contact pattern, the Incubator Profile, and the Device Application profile for each system device.

In an embodiment, a computer implemented method for distributing software includes providing computer code. In this embodiment, the provided code may be considered as the payload for delivery to the target elements of the overall system. The payload may comprise watermark elements, signature elements, diagnostic software or other elements intended to be functional aspects of the device code but hidden from easy discovery once in place or during execution. The payload may be coded using any software language. In an embodiment, the payload comprises malware detection program (MDP) code intended to scan system resources for malware and upon detection, to remove, quarantine, or report the malware.

The payload software is subjected to a shredding process wherein the software is subdivided into a set of code fragments or shreds. Each shred comprises a portion of the overall payload and the complete set of shreds comprises the entirety of the overall payload software. The shredding process may take the D2D Pattern and the Device Application Profile and the Incubator profile as potential inputs in determining how large each shred should be and therefore how many shreds will be needed. The set of shreds may be translated into binary for transmission to target devices.

The shreds may be communicated to the target device using either wireless or wired pathways. To reduce the impact of any transmission related errors upon the delivered payload, the fault tolerance, i.e., the ability to recover the information a shred contains even if a portion of the transmitted data is corrupted or lost, may be enhanced. In an embodiment, the shreds may be erasure coded to increase their fault tolerance. In this embodiment, the shreds are erasure coded using fountain code, Reed-Solomon code, or other erasure coding methodologies.

In an embodiment, the shreds may be encrypted. Encryption methods using symmetric keys or public-private asymmetric key combinations may be used to encrypt the shreds to obfuscate the shred content in the event that the transmission of the shred is intercepted, and the shred content is examined. The use of asymmetric keys provides an additional benefit of authentication for shreds decrypted by an SP, as only authentic shreds would properly decrypt using the SP's asymmetric key portion.

In an embodiment, each device may comprise a unique private key and the server may store the public keys for each unique device. In this embodiment, the server may create shreds tailored for each device and encrypted using the public key of the particular device. The tailored shreds may then be distributed as patches in application updates or from peer-to-peer contact. The target decrypts the shreds using the private key.

In an embodiment, the server may comprise a private key used to encrypt all shreds regardless of the target device. In this embodiment, each device comprises the public key of the server held in software or in firmware of the device. Each device may decrypt every shred. In this embodiment, the system administrator may create a single set of shreds which may be transmitted to all networked device. Each device may then decrypt and use the generalized set of shreds to assemble and execute an MDP.

In an embodiment, the shreds may be distributed to the SP of a target device(s) using App Smear coding. App Smear coding smears the shreds across multiple distribution devices, or across multiple device applications. The original set of shreds is subdivided and the subsets of shreds are then distributed to reduce the possibility of detection during distribution. Shreds may be injected individually using the App Smear techniques described herein In an embodiment, the set of shreds are distributed to a target device using interactions between the target and peer devices in the network. The set of shreds is distributed, and smeared across the target's network peers using the D2D Pattern and Incubator Profile information including contact frequency and duration as well as injection sources available to each of the peer devices relative to the target device. More shreds may be distributed to devices having greater contact frequency with the target, or a longer contact duration with the target, or having a more injection channels. As an example, a first peer device may have a D2D Pattern indicating contact once per month, but also indicating a contact duration of over an hour as well as several injection pathways, the D2D Pattern of a second peer device may indicate short duration contact every 15 minutes, and the D2D pattern of a third device may indicate short duration contact once per day. In this example, all desired shreds may be distributed to the first device for injection, and a portion of the set of shreds may be distributed to each of the second and third devices for injection. Individual shreds may be distributed to multiple peer devices to accelerate the delivery of the payload to target devices.

In an embodiment, injection sources take advantage of unconventional avenues such as ambient environment passive sensing, to avoid detection measures focused on monitoring of the device APIs. In this embodiment, the injection sources may be peer devices or system processors or server resources. In this embodiment, the peer device may interact with the target device by altering the environment of the target device thereby causing target device passive sensors to write to data registers. The system processors or server resources may also interact with the target device by altering the environment of the target through changes to building environmental systems and resources. The written data may trigger run-time exceptions in algorithms which read the sensor data registers. The triggered exceptions are sensed by the SP monitoring the main processor of the device. Environmental sensors are difficult or impossible for resident malware to jam or disable. In this embodiment, an algorithm may read the registers of device sensors including light, acceleration, temperature, pressure, magnetic field, and sound sensors.

In this embodiment, the SP is pre-configured with a data model to enable the SP to recognize sequences of triggered exceptions as code shreds. The SP assembles the exception data and recreates the individual shreds. The assembled shreds are decrypted, reversing both the encryption process and the erasure coding process and yielding the original shreds of code. The original shreds are then assembled into the original payload software using sequencing information carried over into the shreds from the original program and executed to accomplish the task of the original program.

Alternatively, as the peer devices alter the environment of the target, thereby altering the value in the data registers of sensors of the target, the SP, following pre-configured instructions, may read the device sensor registers directly to recover the shreds, bypassing a need to monitor triggered exceptions of the main processor.

In an embodiment, the shreds may be deployed to the target through application updates. In this embodiment, a database of device applications is maintained by the administrator to track which applications are present upon any particular device, as well as the frequency of use of the applications on the device, the Device Application Profile (DAP).

Once a device is identified as a target, the DAP may be used to identify applications for further analysis to identify suitable locations for code injection. Applications may be analyzed to identify locations for inserting shreds previously translated into executable, but otherwise non-functional, code strings. Application control flow analysis may be used to identify portions of the application code comprising hotspots in the code subject to frequent execution during the normal or common uses of the application, as well as portions having steady flow execution with few or no branching instructions. Hotspot locations with steady flow represent good locations for code insertion.

In this embodiment, the shreds may be translated into code instructions which will not impact the main code of the host application containing the shred. As an example, a shred sequence of 100100000011, could be injected as an otherwise non-functional code sequence
ADD R1, R2, TMP_REGISTER
ADD R2, R1, TMP_REGISTER
NOOP
NOOP
NOOP
BR J1; J1:NEXT_INSTRUCTION used in a manner that does not affect the main code. A sequence of such instructions interspersed in the main code facilitates the code hiding. In this embodiment, ADD R1, R2, TMP_REGISTER stands for 10, ADD R2, R1, TMP_REGISTER for 01, NOOP for 00, and BR for 11.

Each shred may be translated to a similar string of executable but non-functional code and inserted as a patch into an application at an identified location to increase the likelihood that the target device will execute the patched application code.

Suitably patched versions of host applications, now containing embedded shreds of the payload, may be provided to the device as what appears to be routine application updates. Smearing the shreds of the original program across multiple device applications reduces the possibility of discovery by malicious software monitoring device activity.

In this embodiment, the SP may scan the downloaded updates of the applications, or the execution of the applications by the main processor, for the non-functional code and assemble code into the injected shreds. The SP may be pre-configured with a deciphering key to translate the non-functional code string into a binary sequence of the shred. The SP then decrypts and de-erasure codes the shred to obtain the original code portion as described above. The SP assembles the accumulated shreds using sequence information contained in the original payload source code.

In an embodiment, the SP of a target device may further serve as part of the network of shred disseminating devices. In this embodiment, the target device SP erasure codes and encrypts shreds which have been received and decrypted and proceeds to transmit the encrypted shreds to other network devices using unconventional channels, as the target and other devices come into proximity with each other. In this embodiment, the administrator may treat all devices as target devices. The server may seek to disseminate payload antimalware software across all network device using the methods of the invention. Encrypted payload shreds may be distributed using application updates as well as peer-to-peer methods tailored for each device or generalized to encompass delivery to all devices.

In an embodiment, the SP of the target device executes the code which has been accumulated, decrypted and assembled. Execution of the accumulated code may indicate the presence of malware operating upon the device system. The malware may be removed or quarantined by the MDP. The code may further create an activity log and communicate its activities. In an embodiment where detected malware has been removed or quarantined, the communications may be at a high level, such as a pop-up window providing a link to a log file or other information presented upon the display of the target device, or by direct communication over the network, once any control over network channels by malware has been mitigated. In an embodiment where malware has been detected but not mitigated, potentially leaving conventional communications channels subject to control or observation by malware, the communications may be a reverse of the MDP distribution. In an embodiment, the message is divided into shreds, erasure coded, encrypted and distributed across the peer-to-peer network using light, sound, magnetic fields, or vibrations sensed by peer devices. In this embodiment, receipt of the message by the system triggers further activity such as logging the successful removal of malware, or the need for additional steps in the event of successful identification of malware presence but a failure to mitigate malware effects.

In an embodiment, illustrated in FIG. 1, a system generally noted as 100, comprises a server subsystem 102 and a plurality of networked client devices 104, 106, 108, 110, and 112. The networked devices 104, 106, 108, 110, and 112 communicate wirelessly with the server and with each other over network 114. The networked devices 104, 106, 108, 110, and 112 may also interact with each other using other unconventional channels (not shown) such as light, sound, temperature, magnetic fields, and pressure alterations to the environment of a target device T (not shown) to write data to the device's data registers. Each client device 104, 106, 108, 110, and 112 comprises Client Program 115 which when executed, performs the operational tasks of the target device described herein As shown in FIG. 1, server subsystem 102 comprises a server computer 150. FIG. 1 depicts a block diagram of components of server computer 150 within distributed data processing environment 100 of FIG. 1, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, comprising random access memory (RAM 160 and cache memory 162, persistent storage 170, communications unit 152, input/output (I/O) interface(s) 156 and communications fabric 140. Communications fabric 140 provides communications between cache 162, memory 158, persistent storage 170, communications unit 152, and input/ output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM). In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the software distribution program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, 106, 108, 110, and 112. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., software distribution program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
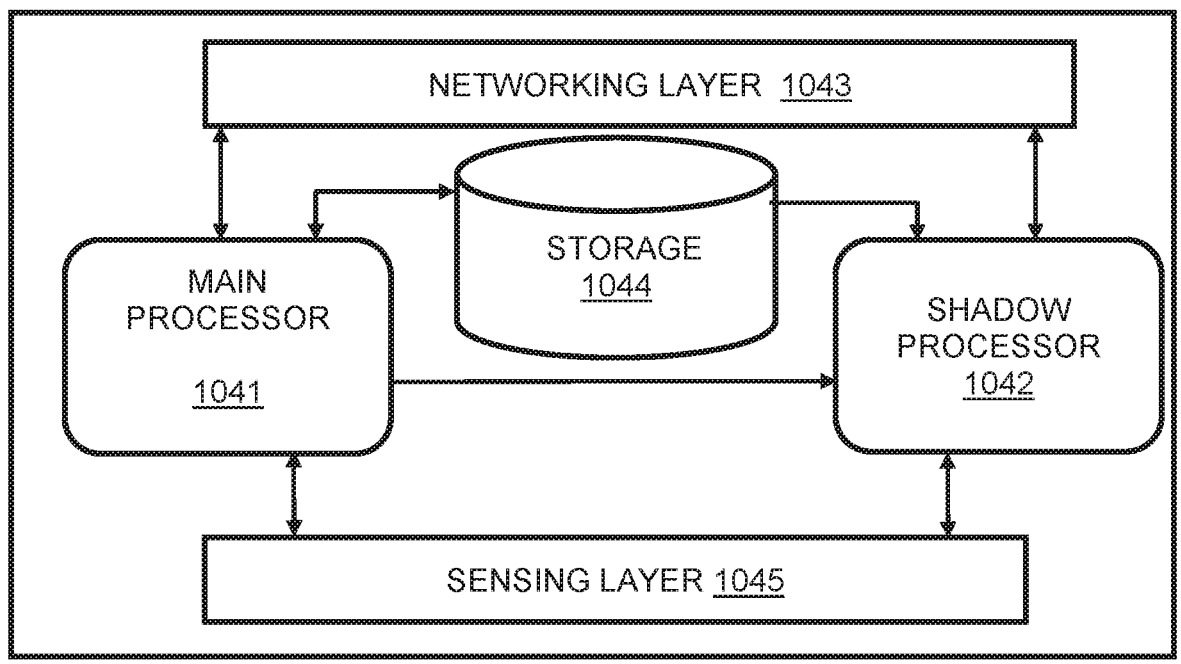
FIG. 2 provides a functional block diagram of a networked device, according to an embodiment of the invention.

As shown in FIG. 2, a representative networked client device 104 comprises a main processor 1041, a SP, 1042, a network communications layer 1043, device storage 1044, and a sensing layer 1045. Sensing layer 1045 comprises one or more device sensors, cameras, microphones, accelerometers, thermometers, barometers, anemometers, and other sensors as are known in the art. The sensors (not shown) output data to registers (not shown) accessible by each of the main processor 1041 and SP 1042. Activities of the main processor 1041 and device storage 1044 are visible to the SP 1042. Activities of the SP 1042 are not visible to the main processor 1041. Each of the main processor 1041 and SP 1042 may interact with the environment through the networking layer 1043.

Figure 3:
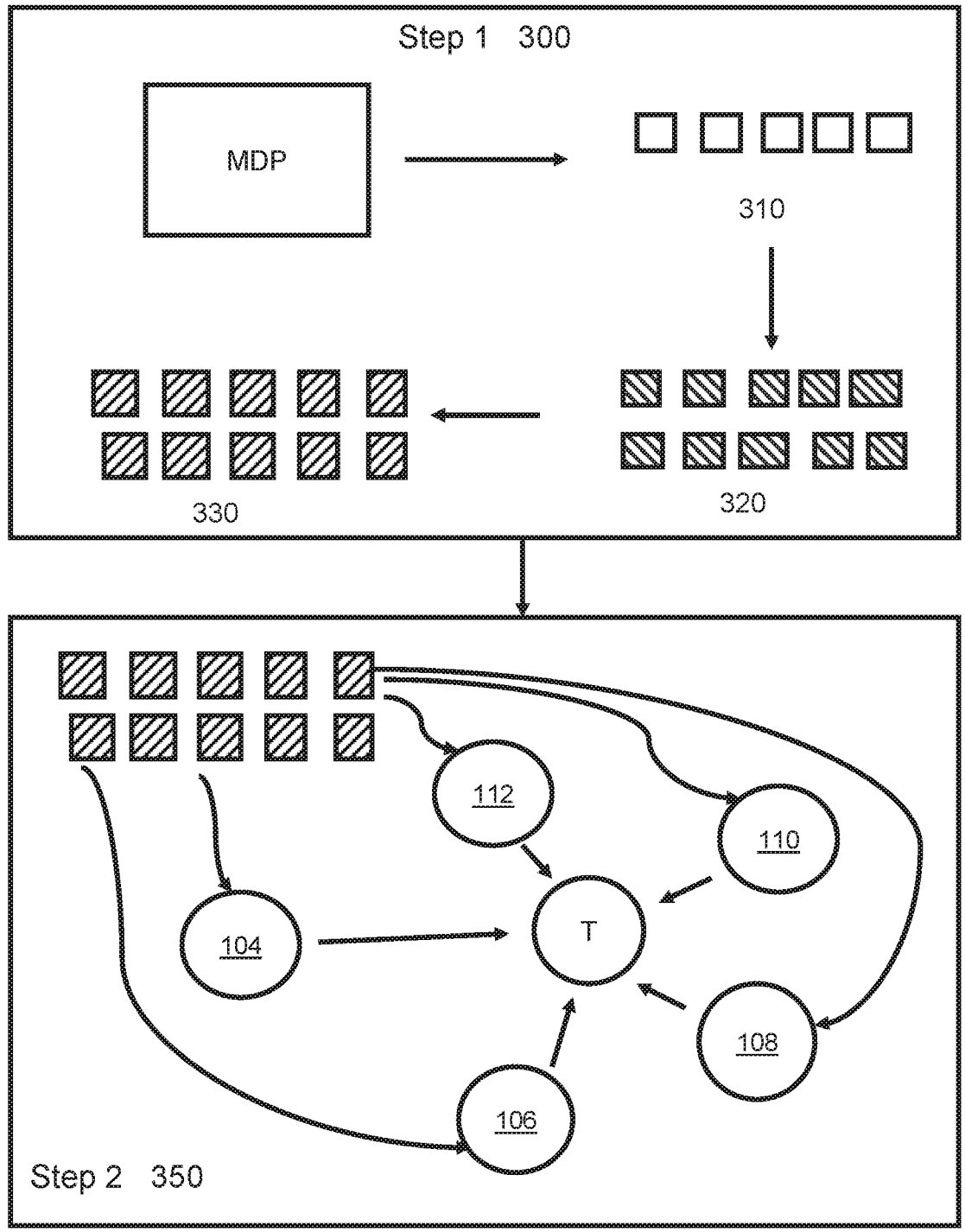
FIG. 3 provides a schematic view of the steps, according to an embodiment of the invention.

In an embodiment illustrated in FIG. 3, in step 1, reference number 300, at 310, an MDP is converted to shreds by a server subsystem computer 150 of FIG. 1, executing software distribution program 175 of FIG. 1. At 320, the shreds are erasure coded by computer 150. At 330, the erasure coded shreds are encrypted by computer 150. As shown in the figure, the encrypted shreds are passed to step 2, reference number 350, by computer 150. In step 2, the encrypted shreds are distributed to a target device T. The encrypted shreds 330 may be distributed amongst a set of peer-to-peer networked devices 104, 106, 108, 110 and 112, for transmission to other devices and the target device T. Encrypted shreds are then injected into the other devices and target device T using unconventional channels and the sensing layer data registers of device T by altering the environment of the devices by a combination of server subsystem 102 and networked devices 104, 106, 108, 110, and 112.

In this embodiment, any of networked devices 104, 106, 108, 110, and 112, may be a target for code shred insertion. In one embodiment, every device 104, 106, 108, 110, and 112, of the system is a target device T. In this embodiment, the system administrator (server computer 150 of FIG. 1) may determine a need to distribute MDP to all networked devices 200. Encrypted shreds 330 may be inserted into copies of applications resident upon target device T as executable non-functional code 340 by server computer 150. The executable, non-functional code 340 may then be transmitted directly to target device T as patched versions of the resident applications, using conventional network channels by server computer 150. The non-functional code may then be translated into binary, decrypted and assembled into the MDP by a SP of target device T.

Figure 4:
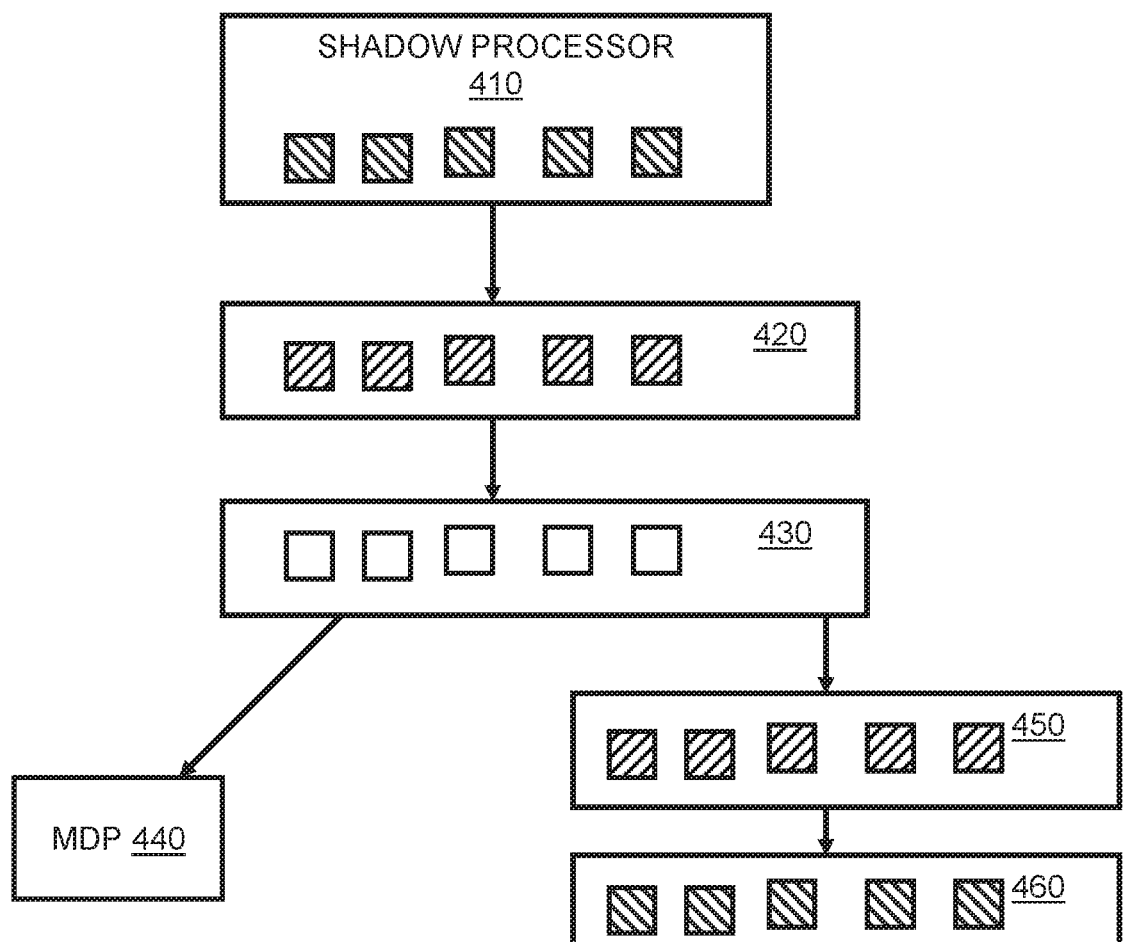
FIG. 4 provides a schematic view of the steps, according to an embodiment of the invention.
Figure 6:
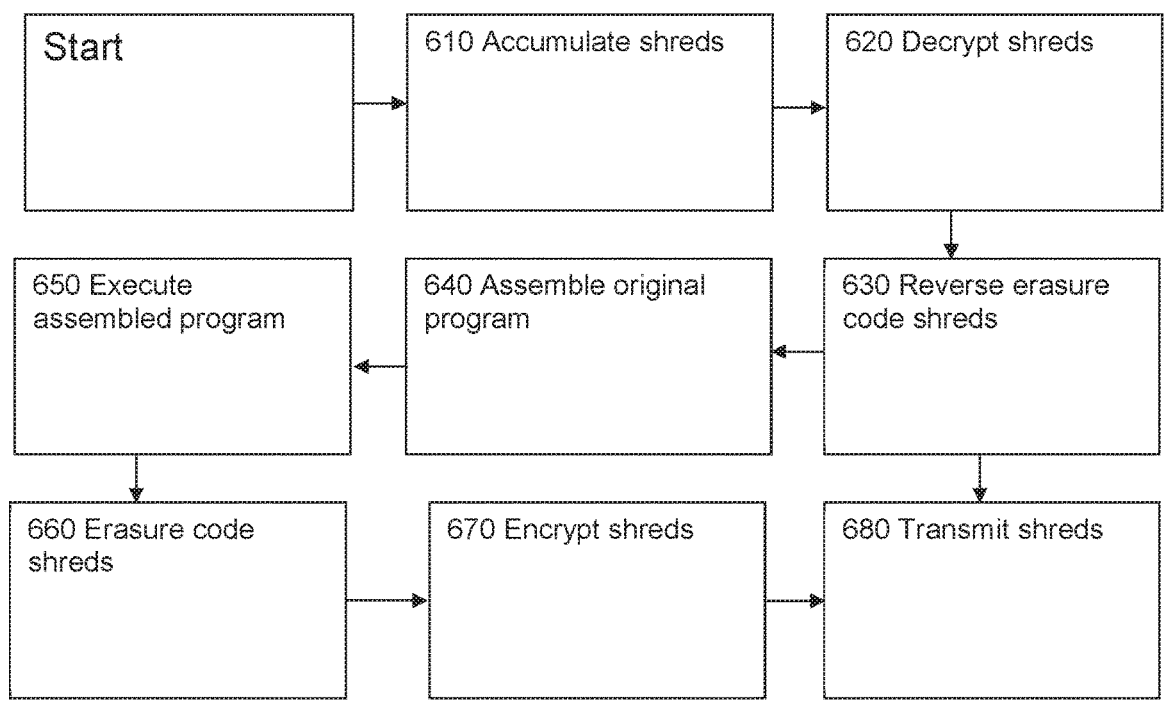
FIG. 6 provides a flowchart depicting an embodiment of the invention.

The activities illustrated in FIGS. 4 and 6 are executed by the SP of the target device executing software distribution program 115 of FIG. 1. In an embodiment illustrated in FIG. 4, at 410, an SP decrypts a set of accumulated shreds using pre-configured keys, such as either the private or public key of an asymmetric key pair, yielding a set of erasure coded shreds. At 420 the erasure coded shreds are then reverse erasure coded by the SP, yielding the original shreds. At 430 The original shreds 416 are then assembled by the SP into original MDP 440 using sequencing information carried in the shreds. Original shreds are also erasure coded by the SP at 450 and encrypted by the SP at 460 for transmission by the SP to other devices.

Figure 5:
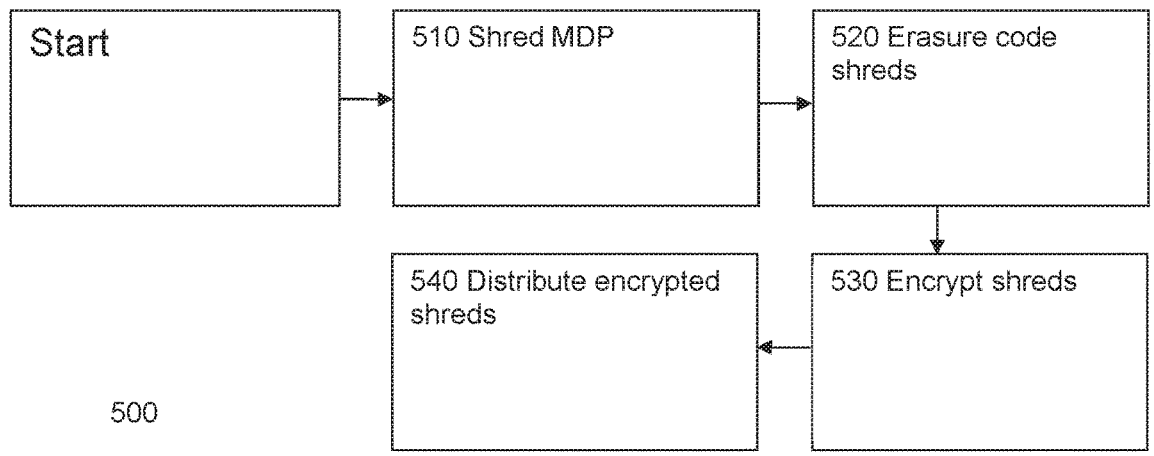
FIG. 5 provides a flowchart depicting an embodiment of the invention.

The flowchart 500 of FIG. 5 illustrates the operational steps of an embodiment of the invention. After the program start, an MDP is shredded at step 510 into a set of code shreds by server subsystem computer 150. The shreds of step 510 are then erasure coded at step 520 using fountain code, Reed-Solomon techniques, or other erasure coding methods by computer 150. The erasure coded shreds are then encrypted by computer 150 at step 530 using one key of an asymmetric key pair. The encrypted shreds are then distributed by computer 150 and networked devices 104, 106, 108, 110, and 112, to a device at step 540 using the distribution methods described above.

In an embodiment illustrated in the flowchart 600 of FIG. 6, program shreds are accumulated by an SP at step 610. The shreds are accumulated from injection sites such as sensing level data registers, main processor algorithms triggered exceptions, and non-functional code from patched application updates. Pre-configured cryptography keys are used by the SP to decrypt and authenticate the shreds at step 620. The decrypted shreds are then reverse erasure coded by the SP to yield original shreds at step 630. The original shreds are assembled by the SP into the original executable program using sequencing information contained in the original code at step 640. The original program code is then executed by the SP at step 650. The original shreds are also erasure coded by the SP at step 660. The erasure coded shreds are encrypted by the SP at step 670. The encrypted shreds are transmitted to other devices by the SP at step 680.

In an embodiment, a system administrative server receives an updated MDP. The updated MDP is shredded, erasure coded, and encrypted. The resulting shreds are then inserted as non-functional code in one or more applications resident on a portion of the plurality of networked devices in the system. The patched applications are pushed to the networked devices as an update. The devices execute the patched applications enabling the devices' SPs to recognize and extract the encrypted code shreds from the non-functional instructions. The shreds are decrypted using a public key. The shreds are then reverse erasure coded to extract the original program shred which are then assembled into the updated MDP and executed. The shreds are subsequently disseminated across the network using direct injection by the plurality of devices into the remainder of the network. The injection occurs by the plurality of devices altering the environment of the remaining device by emitting light, magnetic fields, and sound etc. to alter data registers of the remaining devices as they come into proximity with the plurality of devices.

In an embodiment, a computer implemented method comprises: accumulating shreds of computer code by an SP of a device; assembling an executable program from the accumulated shreds; and executing the assembled computer program.

This embodiment may further include the steps of extracting the shreds by monitoring a processor of the device, wherein the step of extracting the shreds by monitoring a processor of the device comprises SP monitoring exceptions triggered in device code or translating instructions in executed device code.

This embodiment may also include: reading device sensor data registers, decrypting a shred including authenticating the shred, and reverse erasure coding the shred.

In this embodiment, the step of executing the assembled computer program includes: generating an output; dividing the output into shreds; and transmitting the shreds and may optionally include erasure coding a shred; and transmitting the erasure coded shred, as well as encrypting the shred, and transmitting the encrypted shred.

This embodiment may further include; retrieving an original software shred; decrypting the software shred; erasure coding and encrypting the software shred; and transmitting the encrypted shred.

In an embodiment, a computer program product for distributing software includes one or more computer readable storage devices and program instructions stored on the one or more computer readable storage devices, the stored program instructions comprising: program instructions to accumulate shreds of computer code; responsive to the accumulation of shred, program instructions to assemble an executable program from the accumulated shreds; and responsive to the assembly of an executable program from the shreds, program instructions to execute the assembled program.

This embodiment may further include program code for extracting shreds by a SP monitoring a main device processor and program code for directly reading device environmental sensor data registers.

The embodiment may further include program code for: retrieving an original code shred; responsive to the retrieval of an original code shred, program code for erasure coding the original code shred; responsive to the erasure coding of an original code shred, program code for the encryption of the erasure coded shred; and responsive to the encryption of the erasure coded shred, program code for the transmission of the encrypted shred.

In an embodiment, a computer system for distributing software includes: one or more computer processors; one or more computer readable storage devices; program instructions stored on the one or more computer readable storage devices for execution by the at least on computer processor, the stored program instructions comprising: program instructions to accumulate shreds of computer code; responsive to the accumulation of shred, program instructions to assemble an executable program from the accumulated shreds; and responsive to the assembly of an executable program from the shreds, program instructions to execute the assembled program executing the assembled computer program.

This embodiment may also include program code for extracting shreds by a SP monitoring a main device processor and program code for directly reading device environmental sensor data registers, as well as program code for: retrieving an original code shred; responsive to the retrieval of an original code shred, erasure coding the original code shred; encrypting the erasure coded shred; and transmitting the encrypted shred.

The disclosures may be implemented as a turn-key system, wherein all system components are provided to a Client, the Client then installing and administrating the use of the disclosures. In an embodiment, the disclosures may be implemented as a service wherein a Service Provider provides all necessary implements and also provides the administrative aspects necessary to use and maintain the systems and methods. Hybrid implementations wherein aspects are undertaken by a client while other aspects are undertaken by a service provider are also possible. The systems and methods of the disclosure may be implemented utilizing typical networked resources. The systems and methods may also be implemented using cloud computing resources.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
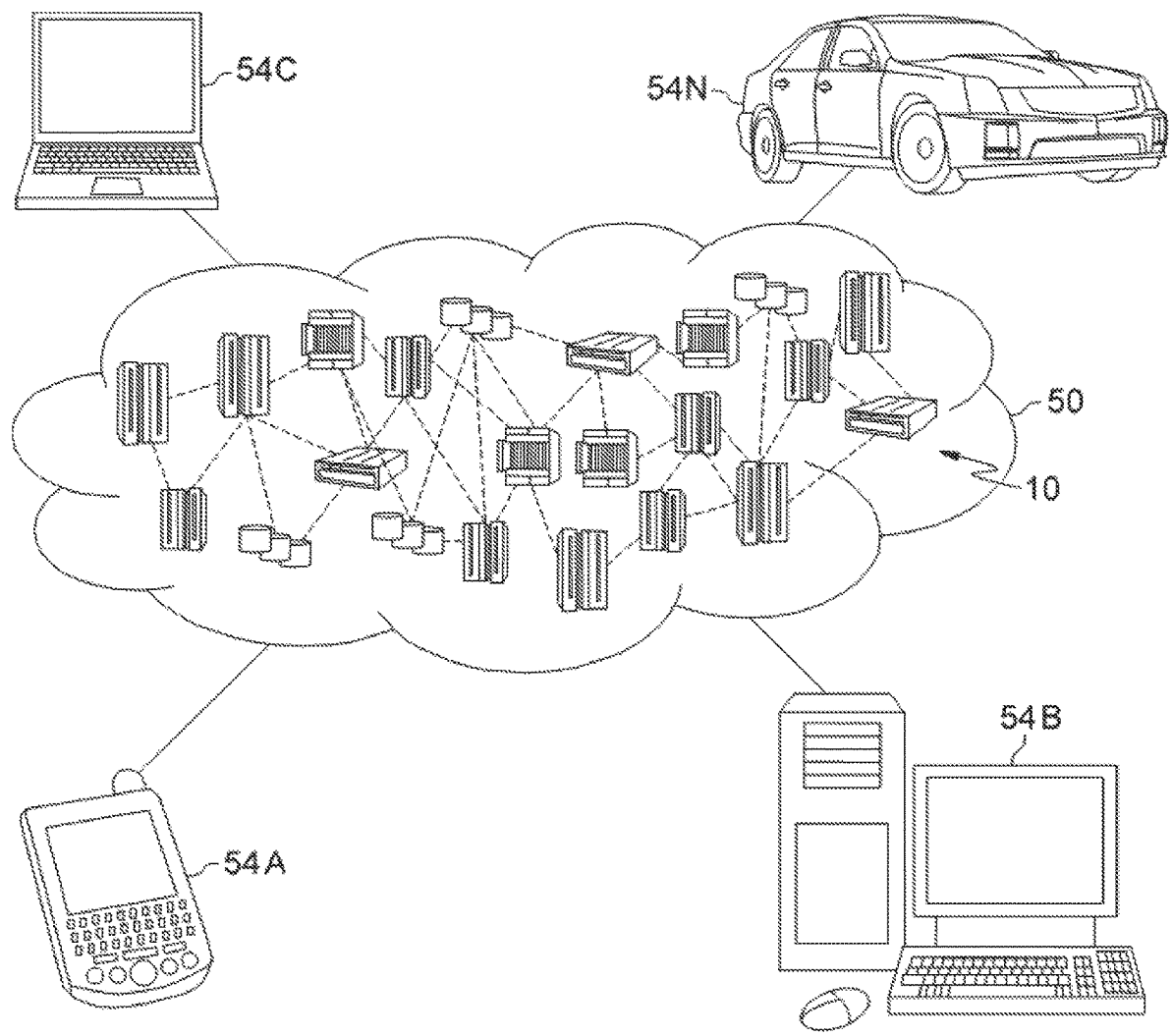
FIG. 7 depicts a cloud computing environment, according to an embodiment of the invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
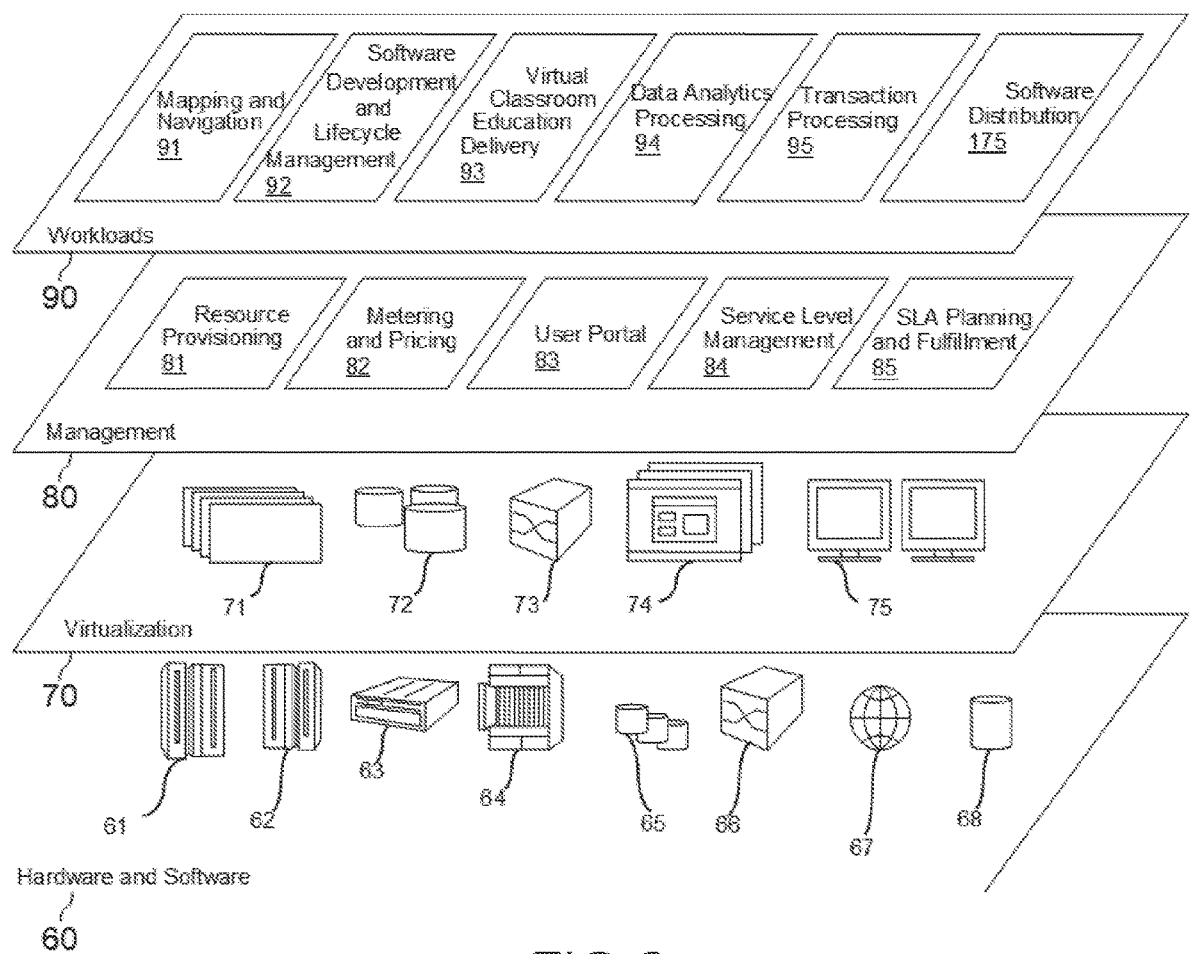
FIG. 8 depicts abstraction model layers, according to an embodiment of the invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software distribution program 175.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for distributing software, the method comprising:
   providing computer code;
   dividing, by one or more computer processors, the computer code into a set of shreds;
   erasure coding the shreds by one or more computer processors, yielding erasure coded shreds;
   encrypting the erasure coded shreds by one or more computer processors, yielding encrypted shreds;

distributing, by one or more computer processors, the encrypted shreds to a shadow processor of a device, wherein the shadow processor is configured as a monitor of a main processor and other components of the device;

translating the encrypted shreds into executable code language; and distributing patched applications comprising the executable code language.

2. The computer implemented method of claim 1 further comprising receiving, by one or more computer processors, a response associated with execution of the computer code.

3. The computer implemented method according to claim 1 wherein dividing, by one or more computer processors, the computer code into shreds comprises dividing the computer code into shreds according to an application profile associated with the device.

4. A computer program product for distributing software, the computer program product comprising:

one or more computer readable storage device and stored program instructions on the one or more computer readable storage devices, the stored program instructions comprising:

program instructions to receive payload computer code;

program instructions to divide the received payload computer code into a set of shreds in response to receiving the payload computer code;

program instructions to erasure code the set of shreds, yielding erasure coded shreds;

program instructions to encrypt the erasure coded shreds yielding encrypted shreds;

program instructions to distribute the encrypted shreds to a shadow processor of a target device, wherein the shadow processor is configured as a monitor of a main processor and other components of the device;

program instructions to translate the encrypted shreds into executable code language; and program instructions to distribute patched applications comprising the executable code language.

5. A computer system for distributing software, the computer system comprising:

one or more computer processors;

one or more computer readable storage devices;

stored program instructions on the one or more computer readable storage devices for execution by the at least one computer processor, the stored program instructions comprising:

program instructions to receive payload computer code;

program instructions to divide the received payload computer code into as set of shreds in response to receiving the payload computer code;

program instructions to erasure code the set of shreds, yielding a set of erasure coded shreds;

program instructions to encrypt the erasure coded set of shreds, yielding encrypted shreds;

program instructions to distribute the encrypted shreds to a shadow processor of a target device, wherein the shadow processor is configured as a monitor of a main processor and other components of the device;

program instructions to translate the encrypted shreds into executable code language; and program instructions to distribute patched applications comprising the executable code language.

6. The computer system according to claim 5, further comprising program instructions to receive a response from the target device.

\* \* \* \* \*